Patented Nov. 5, 1929

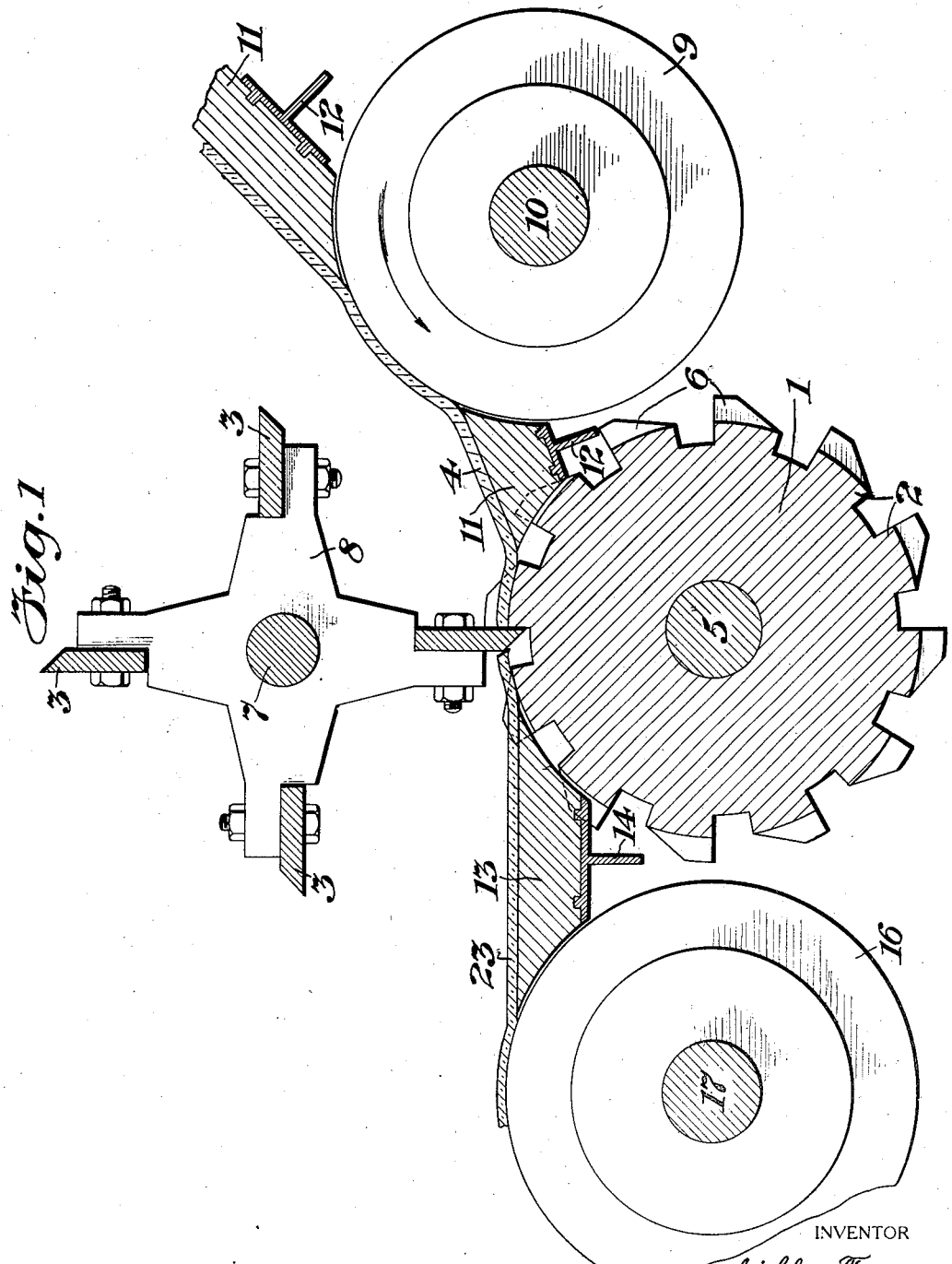

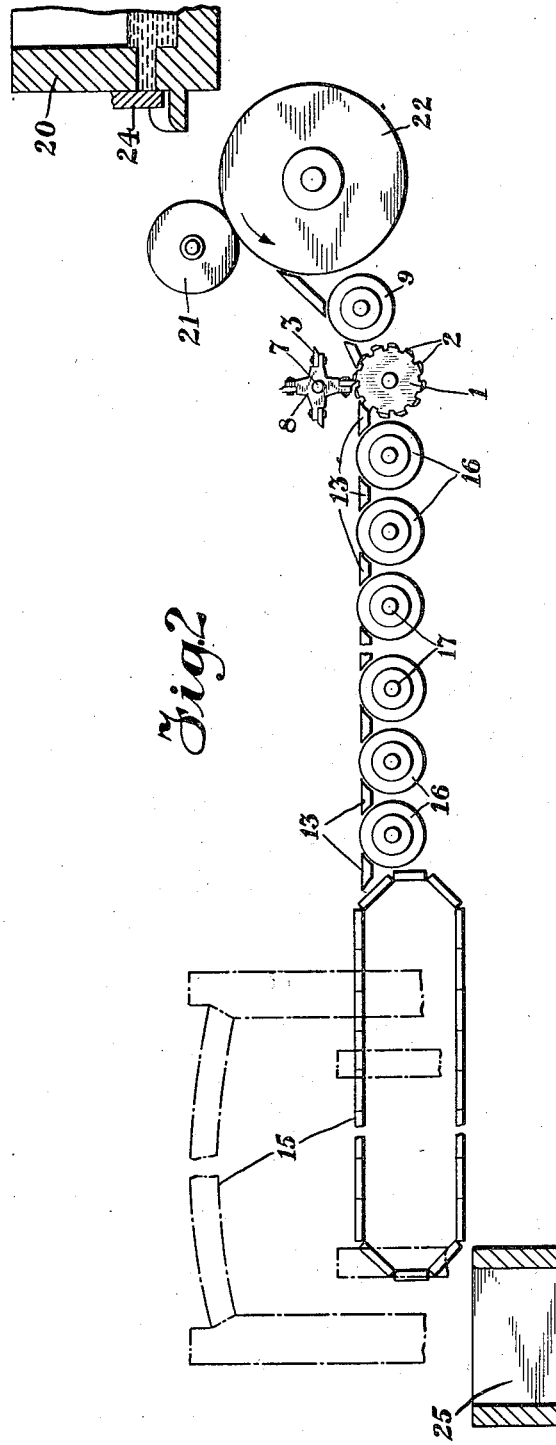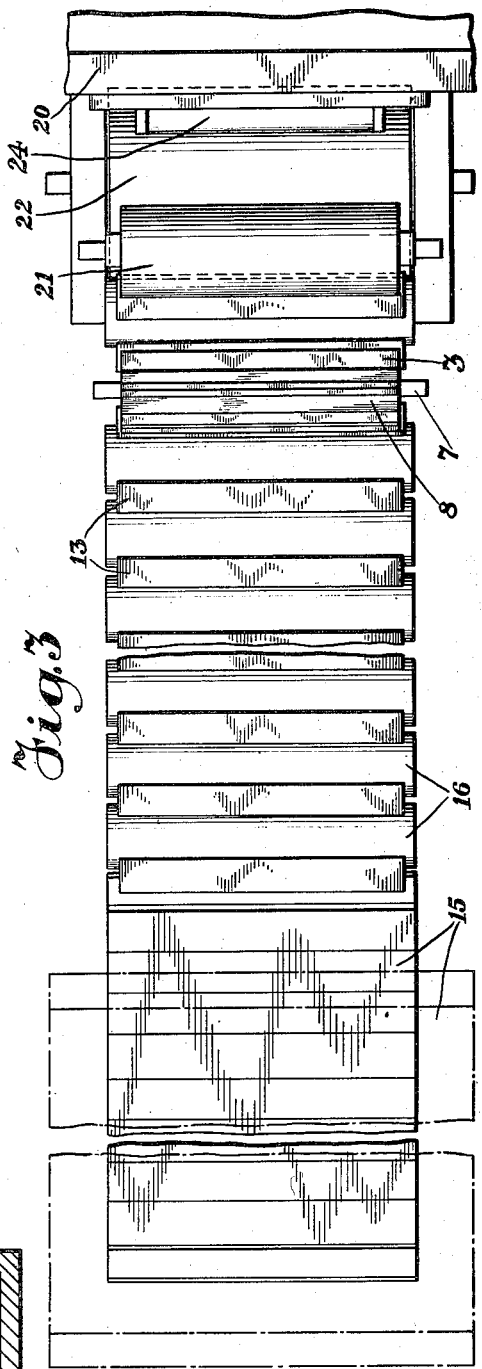

1,734,250

UNITED STATES PATENT OFFICE

NICKLAS FRANZEN, OF LONG BEACH, CALIFORNIA, ASSIGNOR TO MISSISSIPPI GLASS COMPANY, OF NEW YORK, N. Y., A CORPORATION OF NEW YORK

PRODUCING SHEET GLASS

Application filed May 15, 1925. Serial No. 30,523.

My present invention relates to method and means for forming molten glass into sheet form and cutting it into given widths and transporting said severed sheets into proper receiving apparatus. It relates more particularly to method and means for severing long streams of molten glass transversely into sheets of a length substantially that of the width of said stream, and for handling said stream before and after such severing.

In the formation of molten glass into sheets of narrow width economy of space, time and apparatus is secured, I find, by first forming the flowing stream of molten glass into a sheet of a width substantially equal to the length of the desired finished sheets and then severing the flowing sheet as it passes from the forming means transversely into sheets of dimensions substantially those of the finished sheet.

For such severing I provide two rotative elements having cooperating edges radially arranged on their respective spindles to perform successive cutting operations as they are rotated with their spindles whereby the stream of formed glass is subjected to a succession of shearing operations during which said sheet is severed into a series of smaller sheets.

For transporting the glass sheets from the severing mechanism I provide a series of driven rolls between which are mounted bridging members of refractory material which with the said rolls form a substantially flat and even propelling surface which keeps the yet soft sheets from warping as they are being transported.

Other aims and objects of my invention will appear from the specification and the drawings in which latter, Fig. 1 is an elevation view in part section of the sheet severing means of my invention, Fig. 2 is an elevation view in part section or glass working mechanism and apparatus from melting furnace to annealing lehr and in which the severing means, forming devices, and transporting means of my invention are employed, and Fig. 3 is a plan view of the mechanism of Fig. 2.

In the drawings the hob 1 carries about its circumference the teeth 2, 2, whose edges cooperate with the outward edges of the rotating knives 3, 3, to perform a shearing action on material of an operable thickness presented between them. The spindle or shaft 5 carries said hob and serves to impart to it a rotative motion and the upwardly extending flanges 6, 6, at each end of said hob serve to guide the sheet of glass 4 as it passes over the hob. The shaft 7 carries the knife 3 with its mounting member 8 and serves to impart thereto a rotative motion cooperative with that of said hob 1. The distance between cuts made by said knives and hob is controllable by regulating the rate of rotation of said knives and by the number of knives carried by member 8 or its equivalent. For example, in the device shown in the drawings when the knives are rotated at the same circumferential speed as said hob the distance between cuts or the width of the sheet formed will be substantially equal to the circumferential distance between said knives at their cutting edges. The roll 9 rotated by shaft 10 serves to drive the sheet 4 toward the cutting mechanism and the refractory members 11 supported on the T members 12 serve to support said sheet during its travel. The refractory members 13, 13, supported on the T members 14, 14, support the severed sheets as they are carried to the annealing lehr 15 or other device by the propulsion of the driven rolls 16, 16, which are rotated by shafts 17, 17.

In the operation of the apparatus of my invention molten glass is fed from the melting furnace 20 through the spout 24 and passed between the forming rolls 21, 22, and from which in turn it passes to the severing mechanism. As it passes between the members of said severing mechanism which are made to rotate on their shaft at equal circumferential rates of speed, for example, and with the edges of the knives synchronized to perform shearing action with cooperating edges of the hob teeth the sheet 4 is cut into sheets 23 of comparatively narrow width and of a length equal to the width of said sheet 4. The hob and the knives after severing the sheets 23 move them over the refractory members 13 and onto the first of the driven rolls 16 which transport them to the endless conveyor lehr 15 from which they are discharged into the receiving receptacle 25.

I claim:

1. In combination with a glass melting furnace, means for forming sheet glass comprising forming rolls, and sheet severing means comprising cooperative sets of cylically successively engaging shearing members, and sheet propelling means comprising driven rolls with refractory sheet supporting members intermediate them.

2. In glass sheet forming apparatus means for severing formed sheets into smaller sheets comprising cooperating sets of cyclically successively engaging shearing members, means for propelling sheet glass between said cooperating members, and flangial extensions on one of said members for guiding said sheet glass thereover.

In testimony whereof I hereto affix my signature.

NICKLAS FRANZEN.